US010263975B2

(12) United States Patent
Kobayashi et al.

(10) Patent No.: US 10,263,975 B2
(45) Date of Patent: Apr. 16, 2019

(54) INFORMATION PROCESSING DEVICE, METHOD, AND MEDIUM

(71) Applicant: PFU LIMITED, Kahoku-shi, Ishikawa (JP)

(72) Inventors: Takashi Kobayashi, Kahoku (JP); Seigo Terada, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 152 days.

(21) Appl. No.: 15/079,766

(22) Filed: Mar. 24, 2016

(65) Prior Publication Data

US 2017/0155642 A1 Jun. 1, 2017

(30) Foreign Application Priority Data

Nov. 27, 2015 (JP) ................. 2015-231697

(51) Int. Cl.
*H04L 9/32* (2006.01)
*H04L 29/06* (2006.01)

(52) U.S. Cl.
CPC ........ *H04L 63/0823* (2013.01); *H04L 9/3268* (2013.01); *H04L 63/20* (2013.01); *H04L 2209/26* (2013.01)

(58) Field of Classification Search
CPC .. H04L 63/0823; H04L 9/3268; H04L 9/3263
See application file for complete search history.

(56) References Cited

U.S. PATENT DOCUMENTS

| 7,778,194 | B1 | 8/2010 | Yung |
| 8,161,547 | B1 | 4/2012 | Jennings et al. |
| 9,419,942 | B1 * | 8/2016 | Buruganahalli .... H04L 63/0227 |
| 2009/0083537 | A1 * | 3/2009 | Larsen ................ H04L 63/0281 |
| | | | 713/153 |
| 2010/0186086 | A1 * | 7/2010 | Guzner ............... H04L 63/0823 |
| | | | 726/22 |
| 2011/0154017 | A1 | 6/2011 | Edstrom et al. |
| 2011/0158096 | A1 | 6/2011 | Leung et al. |

(Continued)

FOREIGN PATENT DOCUMENTS

| JP | 2006-270504 A | 10/2006 |
| JP | 4667921 B2 | 4/2011 |

(Continued)

OTHER PUBLICATIONS

Hoffman et al., (RFC 6698, Aug. 2012, 37 pages).*

(Continued)

*Primary Examiner* — Oleg Korsak
(74) *Attorney, Agent, or Firm* — Westerman, Hattori, Daniels & Adrian, LLP (57) ABSTRACT

A network monitoring device including: a communication acquiring unit which acquires communication before the communication reaches an opposite party's terminal; a protocol analyzing unit which identifies a message for session establishment by analyzing a protocol of the acquired communication, the message being included in the communication and including a digital certificate of a communication partner in a session to be kept confidential; a certificate extracting unit which extracts a digital certificate from the identified message for session establishment; and an inspecting unit which inspects the extracted digital certificate.

13 Claims, 8 Drawing Sheets

(56) References Cited

U.S. PATENT DOCUMENTS

2013/0212663 A1* 8/2013 Edge .................. H04W 12/06
726/7
2014/0196108 A1 7/2014 Barr et al.

FOREIGN PATENT DOCUMENTS

JP  2012-532516 A  12/2012
JP  2015-82769 A   4/2015

OTHER PUBLICATIONS

Jarmoc (SSL/TLS Interception Proxies and Transitive Trust, Black Hat Europe—Mar. 14, 2012, 21 pages).*
Notice of Reason for Rejection dated Jul. 19, 2016 issued in the corresponding Japanese Patent Application No. 2015-231697 with English Translation. (12 pages).
Masaki Shimaoka et al., "Textbook of SSL/TLS for securing safe communication: Let's master how to ensure the Internet communication security", Software Design, Japan, Gijutsu-Hyoron Co., Ltd., Aug. 18, 2015, No. 298, pp. 82-94, with a partial English translation. (14 pages).
Hitachi, Ltd., "Certificate verification server > Product introduction" Sep. 24, 2015, http://www.hitachi.co.jp/Prod/comp/app/kensho/product.html, w/ partial English translation (4 pages).

\* cited by examiner

INFORMATION PROCESSING DEVICE, METHOD, AND MEDIUM

CROSS-REFERENCE TO RELATED APPLICATION

This application is based upon and claims the benefit of priority of the prior Japanese Patent Application No.JP2015-231697, filed on Nov. 27, 2015, the entire contents of which are incorporated herein by reference.

FIELD

The present disclosure relates to a technique for inspecting a digital certificate.

BACKGROUND

Conventionally, a certificate verification server which accepts an inspection request from a client and verifies a certificate has been proposed (refer to Hitachi, Ltd., "Certificate verification server>Product introduction" http://www.hitachi.co.jp/Prod/comp/app/kensho/product.html, acquired Sep. 24, 2015).

In addition, an analysis device is proposed which, when a terminal performs any of known illegal communications, acquires access URLs of communication destinations used by the terminal for communication within a time slot of a predetermined range from a start time of the illegal communication and, based on a frequency at which the access URL of each acquired communication destination appears in the illegal communication and other illegal communications, detects the access URL of a communication destination related to the illegal communication among the access URLs of the respective communication destinations (refer to Japanese Patent Application Publication No. 2015-082769).

SUMMARY

An example of the present disclosure is an information processing device including: communication acquiring means for acquiring communication between a first terminal and a second terminal connected to a network, before the communication reaches an opposite party's terminal; protocol analyzing means for identify a message for session establishment by analyzing a protocol of the communication acquired by the communication acquiring means, the message being included in the communication and including a digital certificate of a communication partner in a session to be kept confidential; certificate extracting means for extracting a digital certificate from the message for session establishment identified by the protocol analyzing means; and inspecting means for inspecting the extracted digital certificate.

The present disclosure may be viewed as an information processing device, a system, a method that is executed by a computer, and a program to be executed by a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of an information processing device, a method, and a program according to the present disclosure will be described with reference to the drawings.

It should be noted that the embodiment described below merely exemplifies the present disclosure and is not intended to limit an information processing device, a method, and a program according to the present disclosure to the specific configuration described below.

When implementing the present disclosure, a specific configuration may be adopted as appropriate in accordance with each embodiment.

In addition, various improvements and modification may be made to the present disclosure.

As the present embodiment, an embodiment in which an information processing device, a method, and a program according to the present disclosure are implemented in a system for monitoring a network will be described.

However, the information processing device, the method, and the program according to the present disclosure can be widely used with respect to techniques for inspecting a digital certificate. Accordingly, subjects of application of the present disclosure are not limited to the examples described in the present embodiment.

<Configuration of System>

Figure 1:
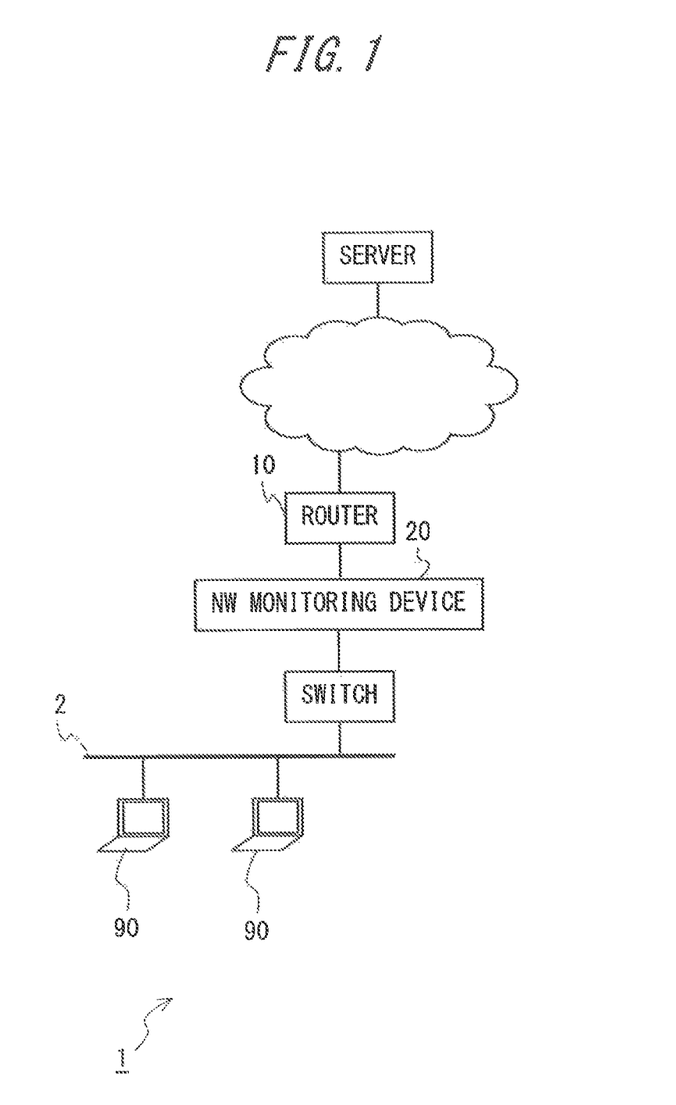
FIG. 1 is a schematic diagram showing a configuration of a system according to an embodiment.

FIG. 1 is a schematic diagram showing a configuration of a system 1 according to the present embodiment. The system 1 according to the present embodiment includes a network segment 2 to which a plurality of information processing terminals 90 (hereinafter, referred to as "nodes 90") are connected and a network monitoring device 20 for monitoring communication related to the nodes 90. In addition, the nodes 90 in the network segment 2 are capable of communicating, via a router 10, with various servers connected at remote locations via the Internet or wide area networks. In the present embodiment, the network monitoring device 20 acquires packets, frames, and the like which pass through the network monitoring device 20 by being connected between a switch or a router (the router 10 in the example shown in FIG. 1) of the network segment 2 and another switch or router that is hierarchically above the network monitoring device 20. In this case, the network monitoring device 20 runs in an in-line mode in which packets that need not be blocked among acquired packets are transferred.

Figure 2:
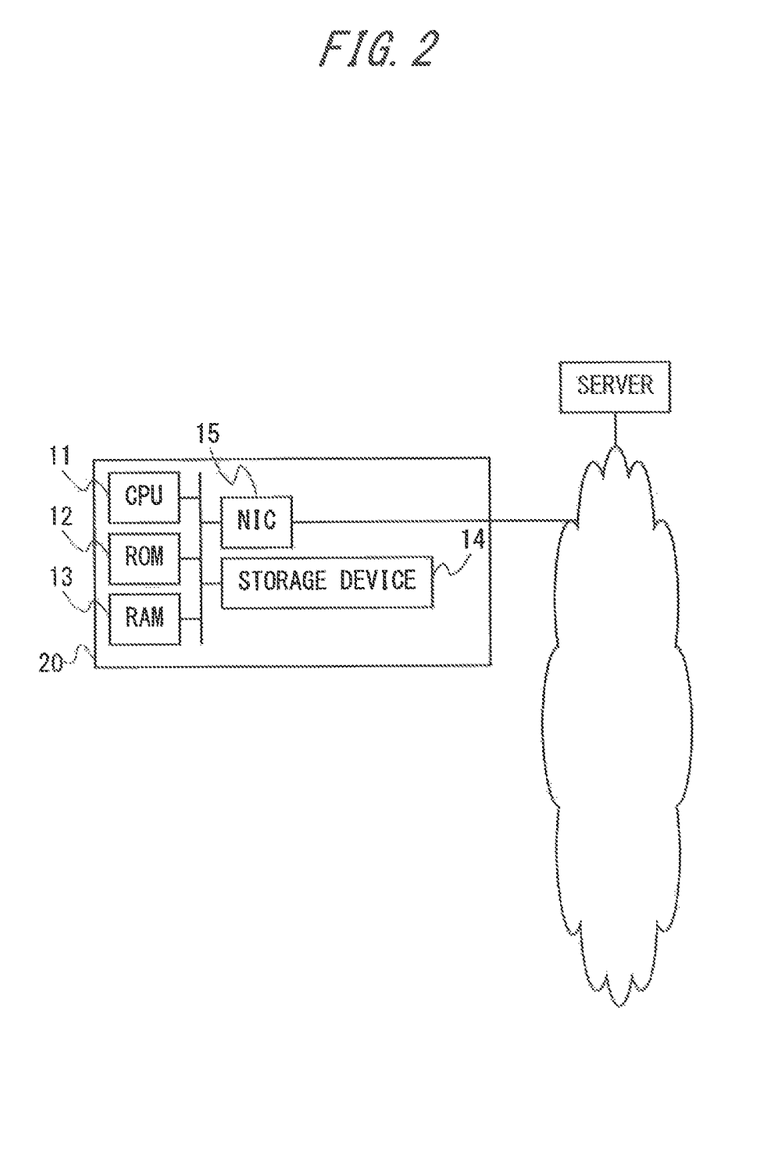
FIG. 2 is a diagram showing a hardware configuration of a network monitoring device according to an embodiment.

FIG. 2 is a diagram showing a hardware configuration of the network monitoring device 20 according to the present embodiment. It should be noted that, in FIG. 2, components other than the network monitoring device 20 (the router 10, the nodes 90, and the like) have been omitted. The network monitoring device 20 is a computer including a central processing unit (CPU) 11, a random access memory (RAM) 13, a read only memory (ROM) 12, a storage device 14 such as an electrically erasable and programmable read only memory (EEPROM) or a hard disk drive (HDD), a communicating unit such as a network interface card (NIC) 15, and the like.

Figure 3:
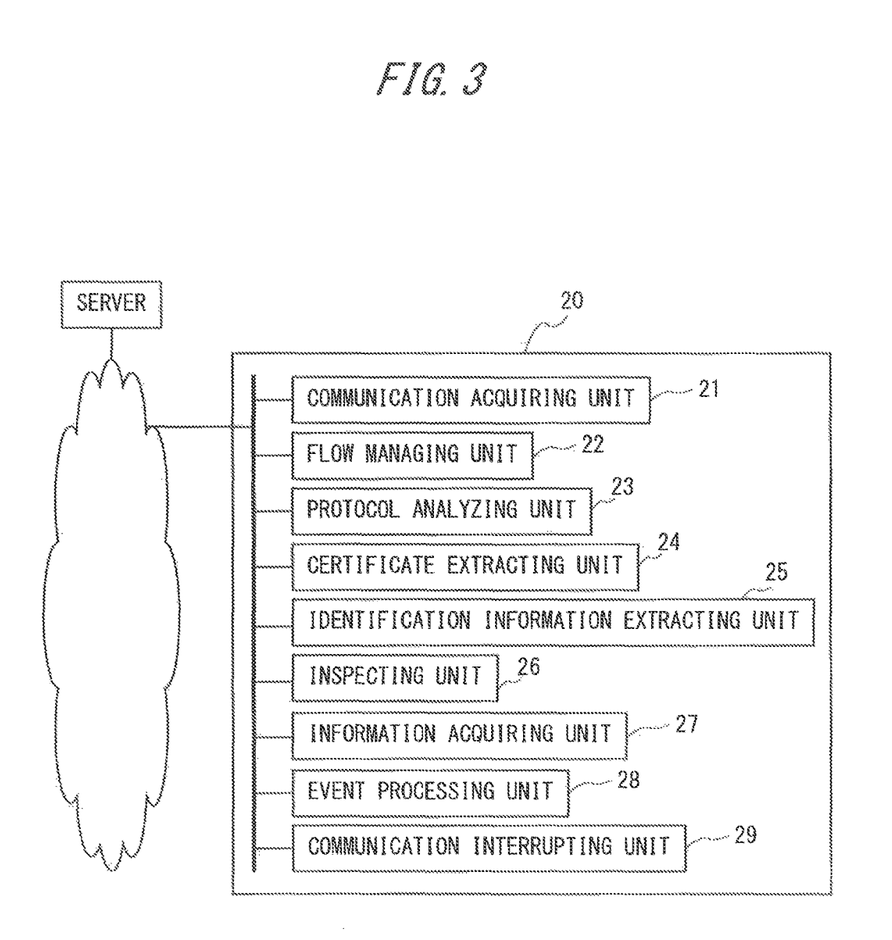
FIG. 3 is a diagram showing an outline of a functional configuration of a network monitoring device according to an embodiment.

FIG. 3 is a diagram showing an outline of a functional configuration of the network monitoring device 20 according to the present embodiment. It should be noted that, in FIG. 3, components other than the network monitoring device 20 (the router 10, the nodes 90, and the like) have been omitted. As a program recorded on the storage device 14 is read onto the RAM 13 and executed by the CPU 11, the network monitoring device 20 functions as an information processing device including a communication acquiring unit 21, a flow managing unit 22, a protocol analyzing unit 23, a certificate extracting unit 24, an identification information extracting unit 25, an inspecting unit 26, an information acquiring unit 27, an event processing unit 28, and a communication interrupting unit 29. Moreover, in the present embodiment, the respective functions of the network monitoring device 20 are executed by the CPU 11 that is a general purpose processor. Alternatively, a part of or all of the functions may be executed by one or a plurality of dedicated processors. In addition, a part of or all of the functions may be executed by a device installed at a remote location or by a plurality of devices installed in a distributed manner using cloud technology or the like.

The communication acquiring unit 21 acquires data of communication transmitted and received by a terminal connected to a network, before the data reaches an opposite party's terminal. Moreover, in the present embodiment, "terminals" to be a subject of monitoring and detection by the network monitoring device 20 include the nodes 90 connected to the network segment 2 as well as other terminals (nodes belonging to other networks, external servers, and the like) that communicate with the nodes 90 via the router 10.

The flow managing unit 22 identifies a communication flow (hereinafter, also simply referred to as a "flow") to which data acquired by the communication acquiring unit 21 belongs and manages each flow by updating a flow table (not shown) based on acquired data, an analysis result, and an inspection result each time data belonging to the flow is received. In this case, a flow refers to a unit for identifying transmission or reception of one block of data such as a transmission control protocol (TCP) connection or an SSL/TLS session.

For each flow of communication acquired by the network monitoring device 20, the flow table manages information related to the flow (hereinafter, referred to as "flow-related information"). In the present embodiment, a flow is identified by being assigned a flow ID. The flow managing unit 22 can retrieve desired flow-related information from the flow table using a flow ID as a key. In addition, a flow is identified by referring to a protocol number, a transmission source IP address, a destination IP address, a transmission source port number, a destination port number, and the like included in a header of a packet. Therefore, when a packet related to a new flow is received, the flow managing unit 22 collects a flow ID and stores a correspondence relationship between the flow ID and information used for identifying the flow described above.

Furthermore, with respect to a plurality of packets acquired by the communication acquiring unit 21, the flow managing unit 22 assembles contents of communication transmitted and received between the node 90 and an external server or the like based on a flow to which each of the plurality of packets belong.

The protocol analyzing unit 23 analyzes subject data acquired by the communication acquiring unit 21 in accordance with characteristics of protocols set in advance in order to identify the protocol related to the flow. In addition, by referring to the contents of communication assembled by the flow managing unit 22 and analyzing the protocol, the protocol analyzing unit 23 identifies a message for session establishment (in the present embodiment, an SSL/TLS handshake) which is included in the communication and which includes a digital certificate of a communication partner in a session to be kept confidential.

The certificate extracting unit 24 extracts a digital certificate (a server certificate and/or a certificate authority certificate) from the message for session establishment identified by the protocol analyzing unit 23.

The identification information extracting unit 25 extracts identification information of a server that is a communication partner of the node 90. The identification information of the server which is extracted at this point is, for example, a fully qualified domain name (FQDN) or an IP address. In addition, the identification information extracting unit 25 may extract the identification information of the server by various methods. For example, the identification information extracting unit 25 can extract the identification information of the communication partner from a message for session establishment (for example, a server name indication (SNI) field of a ClientHello message). Furthermore, the identification information extracting unit 25 may extract the identification information of the communication partner from communication transmitted and received between the node 90 and an external server or the like before the transmission or reception of the message for session establishment in the communication acquired by the communication acquiring unit 21. In this case, "communication transmitted and received between the node 90 and an external server or the like before the transmission or reception of the message for session establishment" refers to, for example, a transmission or reception of a message for name resolution or a 3-way handshake for establishing a session with a proxy server.

The inspecting unit 26 inspects an extracted digital certificate by comparing a value of one or a plurality of predetermined fields included in the digital certificate with a range which is defined in advance and within which the value of each field can fall. In addition, the inspecting unit 26 inspects a digital certificate based on information acquired from an external server.

Furthermore, the inspecting unit 26 inspects validity of a communication partner in a session by comparing the identification information of the communication partner extracted by the identification information extracting unit 25 with subject server information included in a digital certificate (server certificate).

Moreover, the inspecting unit 26 further inspects security strength of a session that is about to be established by comparing an encrypted communication method (an encryption suite) which is included in the message for session establishment and which is used in this session with an encrypted communication method which is defined in advance and which is permitted in an environment in which the information processing device is installed.

The information acquiring unit 27 acquires information related to a digital certificate from an external server (for example, a certificate authority). A certificate revocation list (CRL), online certificate status protocol (OCSP), or the like can be used to acquire the information.

When an event is detected by the protocol analyzing unit 23 or the inspecting unit 26, the event processing unit 28 stores a log (a trail) related to the event or notifies a user of the detection of the event. Examples of an event that is detected in the present embodiment include communication of an illegal digital certificate, an illegal communication partner, communication that does not satisfy a security policy, communication that does not conform to a protocol, and communication performed by malware. More specifically, when a result of an inspection by the inspecting unit 26 does not satisfy predetermined criteria, the event processing unit 28 transmits a notification (a warning) to the node 90, an external server or the like, or an administrator of the information processing device. In addition, the event processing unit 28 accumulates inspection results of the inspecting unit 26 as a log in the storage device 14 or the like.

The communication interrupting unit 29 interrupts communication between the node 90 and an external server or the like when a result of an inspection by the inspecting unit 26 does not satisfy predetermined criteria such as when the inspection result is determined not to be normal. Moreover, while an example in which an action of interrupting the communication by the terminal is taken when the inspection result is determined not to be normal in the present embodiment, the action to be taken when an inspection result is determined not to be normal is not limited to interrupting communication. When it is determined that an inspection result is not normal, the network monitoring device 20 may perform an alert (warning) notification or may heal the terminal engaged in the abnormal communication (for example, by removing malware or eliminating vulnerability).

Moreover, for example, the network monitoring device 20 can interrupt the communication by the node 90 using a method of guiding packet transmission by ARP spoofing with respect to the node 90, a method of instructing the router 10 to discard communication related to the node 90, or a method of changing and isolating a VLAN to which the node 90 belongs. Alternatively, the network monitoring device 20 can directly interrupt communication received or transmitted by the node 90. In addition, for example, the network monitoring device 20 can perform an alert notification using a method of transmitting a notification packet, an e-mail message, or the like to a management server, the node 90, an administrator terminal set in advance, or the like or a method of displaying a warning via a display device (a display, an LED, or the like) provided on the network monitoring device 20 itself.

<Flow of Processes>

Next, a flow of processes executed by the system 1 according to the present embodiment will be described with reference to flow charts. It is to be understood that specific contents and specific processing sequences of the processes shown in the flow charts described below merely represent one example of implementing the present disclosure. Specific contents and processing sequences of the processes may be appropriately selected in accordance with embodiments of the present disclosure.

Figure 4:
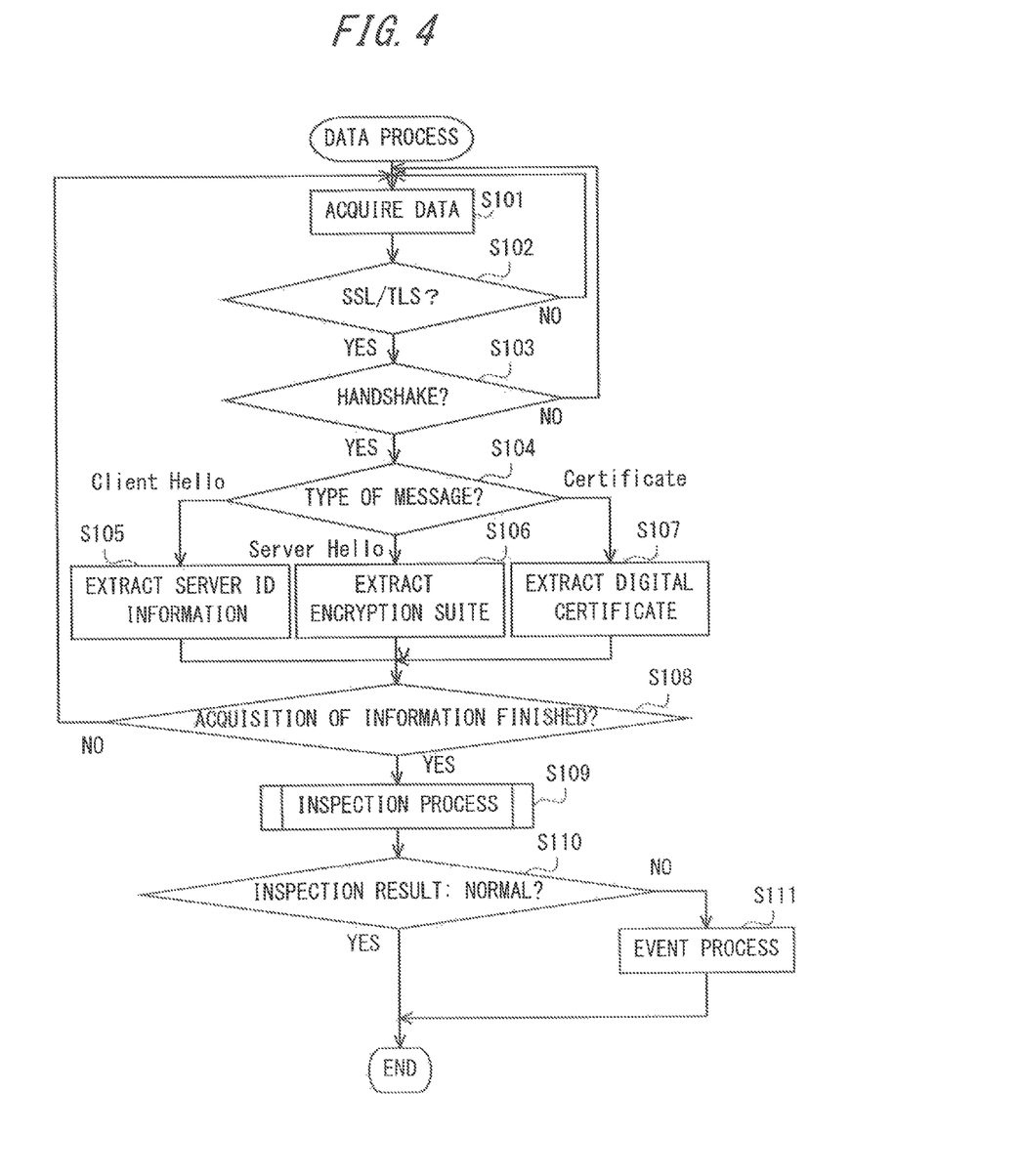
FIG. 4 is a flow chart showing a flow of a data process according to an embodiment.

FIG. 4 is a flow chart showing a flow of a data process according to the present embodiment. The data process according to the present embodiment is executed every time data flowing through the network is acquired by the network monitoring device 20.

In step S101, data is acquired. The communication acquiring unit 21 acquires data which flows through the network and which is related to communication between the node 90 and an external server or the like. At this point, the flow managing unit 22 identifies a flow to which subject data belongs by referring to a header or the like of a packet that includes the subject data and, when the data is divided into a plurality of packets, the flow managing unit 22 acquires a predetermined unit of data by waiting for a plurality of the divided packets to be received.

More specifically, when communication (an input packet) is newly acquired by the communication acquiring unit 21, the flow managing unit 22 shapes the input packet, classifies the input packet, and associates the input packet with a valid existing flow. In addition, the network monitoring device 20 classifies the input packet in terminal units (units of transmission source/destination IP addresses (MAC addresses)), classifies the input packet in units of protocols of a transport layer and higher order layers of the transport layer (TCP, UDP, ICMP, SSL/TLS, and the like), and associates the input packet with an existing flow. Furthermore, by referring to a flow table, the flow managing unit 22 acquires information related to the identified flow. Subsequently, the process proceeds to step S102.

In steps S102 and S103, an analysis (parsing) is performed on whether or not the subject data is a message for a handshake of the SSL/TLS protocol. The protocol analyzing unit 23 refers to the subject data and performs an analysis such as a data parsing process and transaction management. For example, the analysis is performed by comparing the subject data with a data pattern of a protocol defined in advance.

However, methods used to analyze a protocol are not limited to the example according to the present disclosure. For example, whether or not the subject data is a protocol for which the protocol analyzing unit 23 is in charge may be analyzed using a method in which points with respect to consistencies and inconsistencies with a data pattern of a protocol related to the protocol analyzing unit 23 are accumulated and the points are compared with a threshold to determine a resemblance of previously received subject data to the protocol. Moreover, when the subject data is data of the flow of the second and subsequent times or, in other words, when the protocol analyzing unit 23 has previously analyzed data related to the flow, analysis contexts of the analyses of the previous and earlier times are referred to in addition to the subject data.

As a result of the protocol analysis, when it is determined that the subject data is not an SSL/TLS handshake message, the process returns to step S101. On the other hand, as a result of the protocol analysis, when it is determined that the subject data is an SSL/TLS handshake message, the process proceeds to step S104.

In steps S104 to S107, information necessary for an inspection is acquired in accordance with a message type. The protocol analyzing unit 23 determines a handshake message type of the acquired SSL/TLS handshake message (step S104).

When the message type is ClientHello, the identification information extracting unit 25 extracts identification information (specifically, an FQDN, an IP address, or the like) of a server that is the communication partner of the node 90 from an SNI field of the acquired ClientHello message (step S105). However, the identification information of the server that is the communication partner of the node 90 may be extracted from a destination IP address that is set in the packet transmitted from the node 90 to the server.

In addition, when the message type is ServerHello, the protocol analyzing unit 23 extracts an encryption suite (an encrypted communication method: specifically, an encryption method, a key strength, or the like) which is proposed to be used in an SSL/TLS session that is about to be established from the acquired ServerHello message (step S106).

Furthermore, when the message type is a Certificate transmitted from a server, the certificate extracting unit 24 extracts a digital certificate (a server certificate) of a server that is the communication partner of the node 90 from the acquired Certificate message (step S107).

Once various types of information included in the SSL/TLS handshake message are extracted, the process proceeds to step S108.

In step S108, a determination is made on whether or not the acquisition process of information necessary for the inspection has been finished. However, "acquisition process has been finished" does not mean that all of the pieces of information acquirable in steps S105 to S107 have been acquired. Although details will be provided later, for example, since identification information of a server can also be acquired from packets other than the SNI field of a ClientHello message, if acquisition from such other packets has been finished, there is no need to perform the acquisition in step S105. In addition, if the information to be acquired in steps S105 to S107 could not be acquired for some reason (such as the information not included in the packet), a determination that the acquisition process has finished is made in order to start the inspection. When the acquisition process of information has not been finished, the process returns to step S101. On the other hand, when the acquisition process of information has been finished, the process proceeds to step S109.

In step S109, an inspection process is executed. In the inspection process according to the present embodiment, a digital certificate, validity of a communication partner in a session, security strength of secure communication, and the like are inspected. Details of the inspection will be provided later with reference to FIG. 5. Once the inspection is finished, the process proceeds to step S110.

In steps S110 and S111, a result of the inspection is determined and, when the inspection result is not normal, an event process is performed. When it is determined that the inspection result is not normal, the event processing unit 28 performs processes such as saving a trail and notifying an administrator. In addition, interruption of communication may be performed by the communication interrupting unit 29. Moreover, the action to be taken when the inspection result is determined not to be normal is not limited to interrupting communication. When it is determined that the inspection result is not normal, the network monitoring device 20 may perform an alert (warning) notification or may heal the terminal engaged in the abnormal communication (for example, by removing malware or eliminating vulnerability). Subsequently, the process shown in the present flow chart is finished.

Figure 5:
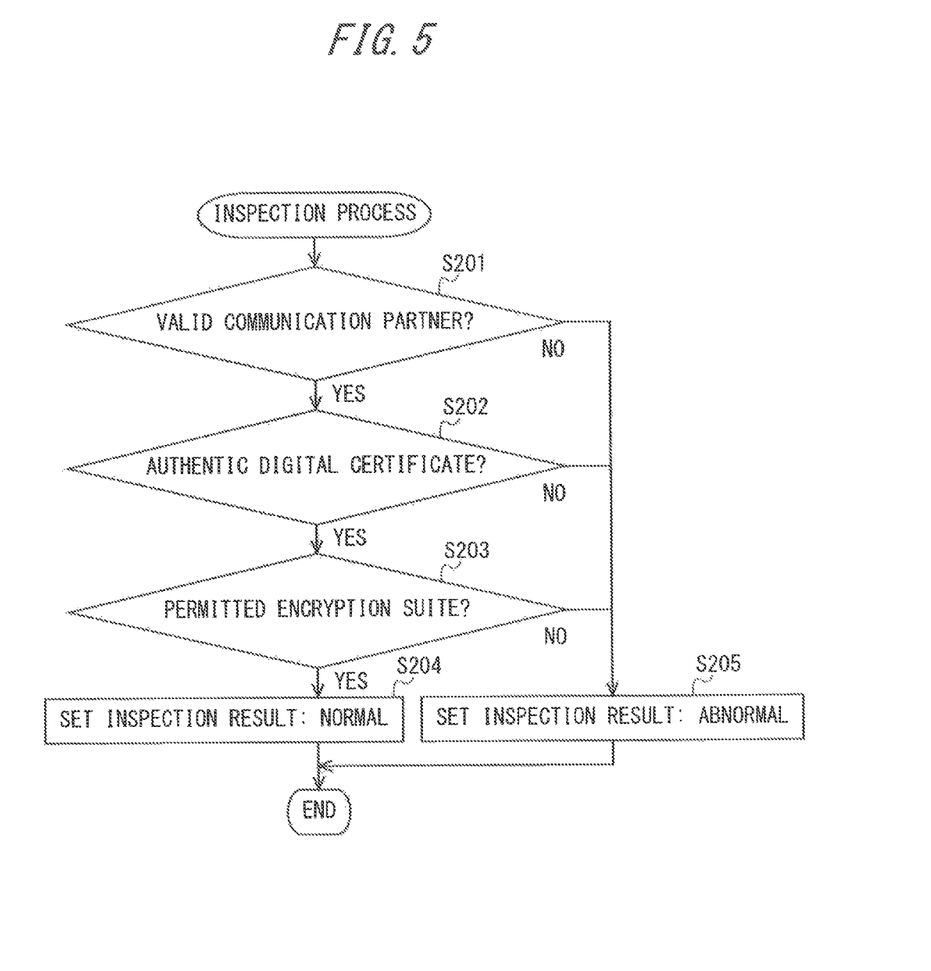
FIG. 5 is a flowchart showing a flow of an inspection process according to an embodiment.

FIG. 5 is a flow chart showing a flow of an inspection process according to the present embodiment. Execution of the inspection process according to the present embodiment is triggered by the inspection process shown in step S109 being called in the processing of data described with reference to FIG. 4. In other words, the flow chart shown in FIG. 5 presents details of the inspection process shown in step S109 in FIG. 4.

In step S201, validity of a communication partner in the session that is about to be established is inspected. The inspecting unit 26 inspects the validity of the communication partner in the session that is about to be established by inspecting consistencies and inconsistencies between the identification information of the communication partner of the node 90 obtained through processes performed so far and subject server information (specifically, information in a subject field and a subjectAltName field) included in a server certificate. The process of the present step may be skipped if identification information of the communication partner has not yet been obtained. When it is determined that the communication partner is not valid, the process proceeds to step S205. On the other hand, when it is determined that the communication partner is valid, the process proceeds to step S202.

In step S202, an inspection is performed on whether not the extracted digital certificate is an authentic digital certificate. For example, the inspecting unit 26 inspects the validity of an SSL server certificate according to the following procedures.

(1) Monitor Server Certificate message of SSL/TLS Handshake protocol. Moreover, in a reuse sequence of an SSL session (an SSL session cache sequence), this item is not inspected since a Server Certificate message is not transmitted.

(2) Inspect contents of SSL server certificate included in Server Certificate message. For example, the inspecting unit 26 deems a certificate not satisfying the following conditions to be an illegal SSL server certificate.

Value of version field is v3 (0×02) (old versions other than v3 are not allowed).
  Values of "notBefore" and "notAfter" of validity field are appropriate (notBefore precedes the present, and notAfter supersedes the present).
  Valid values are set for "keyUsage (Id:2.5.29.15)" and "extKeyUsage (Id:2.5.29.37)" of the extensions field (for example, confirm that a Digital Signature bit or serverAuth (KeyPurposeId:1.3.6.1.5.5.7.3.1) are set).

(3) Verify that SSL server certificate is issued by a valid certificate authority. For example, an SSL server certificate is assumed to be a self-signed SSL server certificate when any of the following conditions is satisfied.

Values of issuer field and subject field are the same.
  Certificate is not signed by a reliable certificate authority.

In addition, when a certificate authority certificate is included in a certificate chain, the certificate authority certificate may also be checked using a similar method (checking contents of respective fields).

As a result of an inspection according to the procedures described above, when it is determined that the digital certificate is not an authentic certificate (the digital certificate is an illegal certificate), the process proceeds to step S205. On the other hand, when it is determined that the digital certificate is an authentic certificate, the process proceeds to step S203.

Furthermore, in order to perform a more detailed inspection, the network monitoring device 20 may confirm the existence of the certificate authority named in the extracted certificate or voluntarily obtain and inspect additional information on the certificate. Specifically, the information acquiring unit 27 acquires information related to a digital certificate from an external server such as a certificate authority. CRL, OCSP, or the like can be used to acquire the information. Subsequently, using the information obtained through an inquiry made to an external service (a CRL or OCSP responder or the like), the inspecting unit 26 more accurately inspects the validity of the certificate. The inspecting unit 26 inspects a digital certificate by comparing one or a plurality of pieces of information acquired from the outside with a range which is defined in advance and within which the value of each piece of information can fall. In addition, using a key of a higher-order certificate authority certificate, the inspecting unit 26 may perform an inspection performed by an ordinary terminal application such as inspecting a signature of a server certificate.

In step S203, security strength of an encryption suite used in the session that is about to be established is inspected. The inspecting unit 26 compares contents of the encryption suite extracted from a message for session establishment with predetermined criteria set in advance. When it is determined that the security strength of the encryption suite does not satisfy the predetermined criteria (for example, a security policy set by the administrator), the process proceeds to step S205. On the other hand, when it is determined that the security strength of the encryption suite satisfies the predetermined criteria, the process proceeds to step S204.

In step S204, as an inspection result, a value indicating that the inspection result is normal is set. Subsequently, the process shown in the present flow chart is finished and a return is made to the data process shown in FIG. 4.

In step S205, as an inspection result, a value indicating that the inspection result is not normal is set. Subsequently, the process shown in the present flow chart is finished and a return is made to the data process shown in FIG. 4.

<Variation 1>

Next, a variation of a method of acquiring information on a communication partner will be described. Since a client application that terminates communication at the node 90 holds information on a communication partner to which the client application wishes to connect, the client application can inspect the validity of the communication partner using the information on the communication partner held by the client application itself. However, since the network monitoring device 20 according to the present embodiment inspects the validity of the communication partner of the node 90 on a transmission path, the network monitoring device 20 does not have information on the communication partner of the node 90. Therefore, the network monitoring device 20 needs to acquire information on the communication partner of the node 90 from communication data. Information on a communication partner can be acquired from any of the following:

(1) Destination IP address of server with which the node 90 actually communicates
(2) FQDN included in DNS query and reply used by the node 90 for name resolution
(3) URI of CONNECT method with which the node 90 requests a tunnel connection to an HTTP proxy
(4) SNI field included in ClientHello message of SSL/TLS handshake to be performed by the node 90

Among the above, since (1) and (4) have already been described with reference to the flow chart shown in FIGS. 4, (2) and (3) will be described below with reference to FIGS. 6 and 7.

Figure 6:
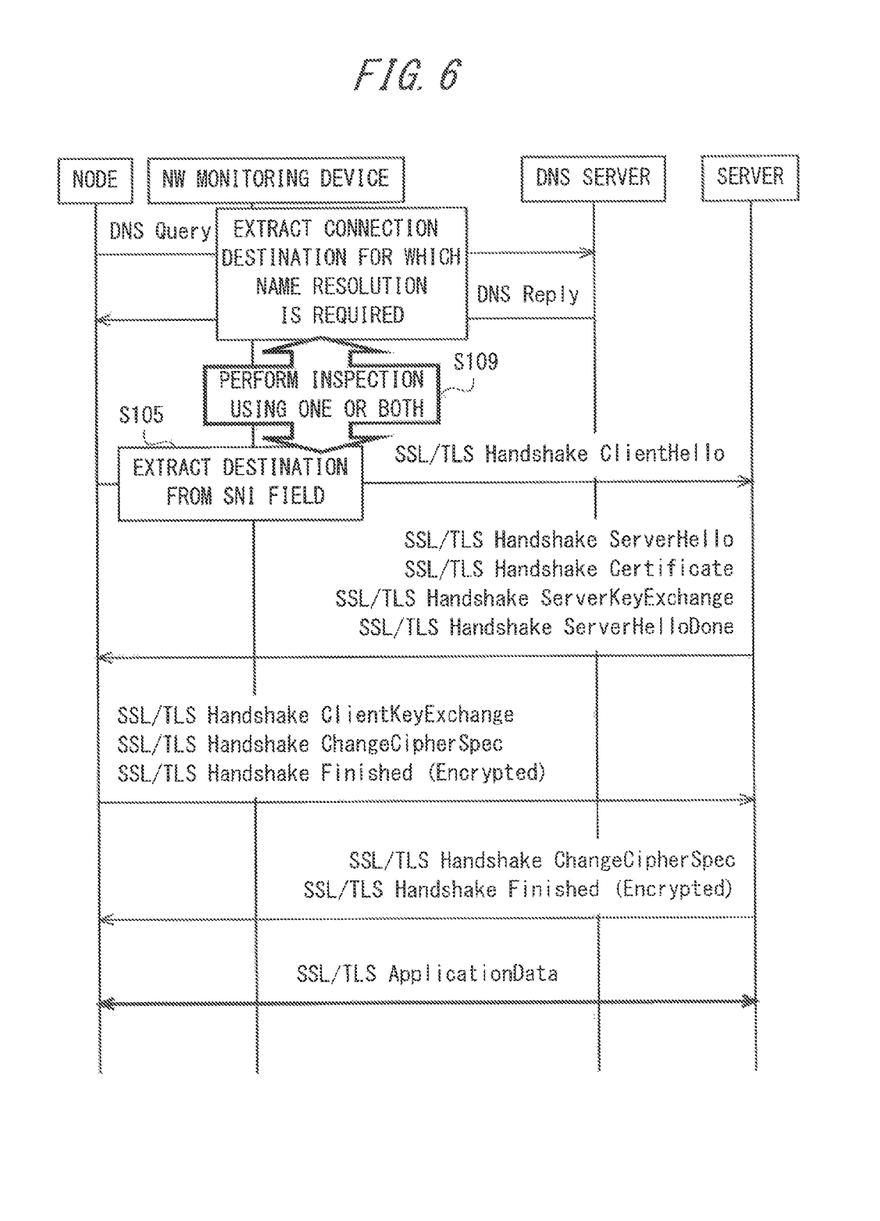
FIG. 6 is a sequence diagram showing a flow of an SSL/TLS session establishment process and a name resolution process that is executed prior to the SSL/TLS session establishment process according to an embodiment.

FIG. 6 is a sequence diagram showing a flow of an SSL/TLS session establishment process and a name resolution process that is executed prior to the SSL/TLS session establishment process according to the present embodiment. The name resolution process shown in the sequence diagram is executed prior to the data process and the inspection process described with reference to FIGS. 4 and 5. When the communication acquired by the communication acquiring unit 21 is determined to be a name resolution protocol by the protocol analyzing unit 23, the identification information extracting unit 25 extracts identification information of a communication partner for which the name resolution is required, from a message (a DNS query or reply) from a message for name resolution. In other words, in the example shown in FIG. 6, the identification information extracting unit 25 extracts identification information of the communication partner from contents of communication transmitted and received before the message for session establishment.

Subsequently, the inspecting unit 26 inspects validity of the communication partner (refer to step S201 for details of the inspection) using any one of or both of identification information extracted by the identification information extracting unit 25 and identification information acquired in step S105 after the name resolution.

Figure 7:
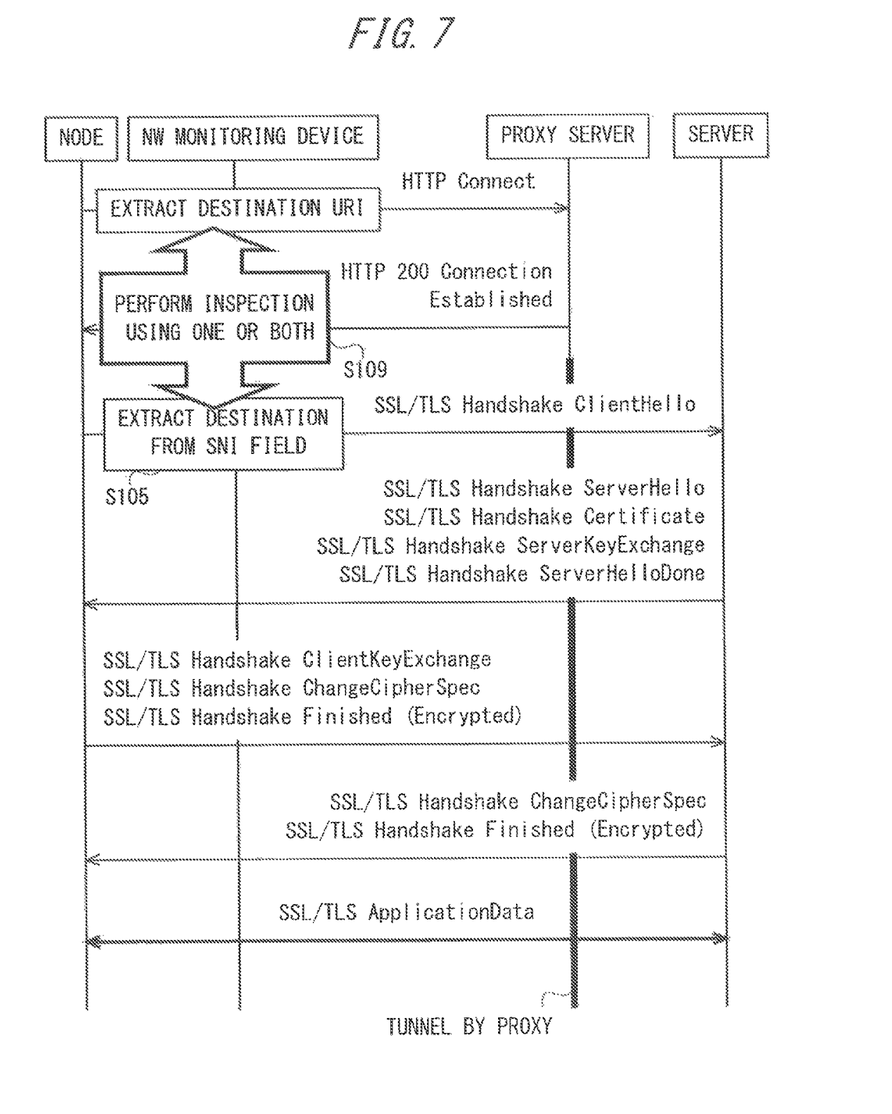
FIG. 7 is a sequence diagram showing a flow of an SSL/TLS session establishment process and a session establishment process with a server that is executed prior to the SSL/TLS session establishment process according to an embodiment.

FIG. 7 is a sequence diagram showing a flow of an SSL/TLS session establishment process and a session establishment process with a proxy server that is executed prior to the SSL/TLS session establishment process according to the present embodiment. The session establishment process with the proxy server shown in the sequence diagram is executed prior to the data process and the inspection process described with reference to FIGS. 4 and 5. When communication acquired by the communication acquiring unit 21 is determined to be communication for establishing a connection with a proxy server by the protocol analyzing unit 23, the identification information extracting unit 25 extracts identification information of a communication partner from information (URI) indicating a destination of communication via a mediation server which is included in a message for session establishment (HTTP CONNECT method) to the proxy server.

Subsequently, the proxy server (the mediation server) mediates communication between the node 90 and an external server or the like. In other words, in the example shown in FIG. 6, the identification information extracting unit 25 extracts identification information of the communication partner from contents of communication transmitted and received before the message for session establishment. Moreover, after establishment of a session with the proxy server, a message for SSL/TLS session establishment is transmitted and received via a tunnel by the proxy server.

Subsequently, the inspecting unit 26 inspects validity of the communication partner (refer to step S201 for details of the inspection) using any one of or both of identification information extracted by the identification information extracting unit 25 and identification information acquired in step S105 after establishment of the session with the proxy server.

<Variation 2>

In the embodiment presented above, an example is described in which, by being connected between a switch or a router and an upper-level switch or router, the network monitoring device 20 runs in an in-line mode to acquire a packet, a frame, or the like that is transmitted and received by the node 90 and transfer packets that need not be blocked (refer to FIG. 1). However, the network configuration presented in the embodiment described above is simply an example of implementing the present disclosure and other network configurations may be adopted to implement the present disclosure.

Figure 8:
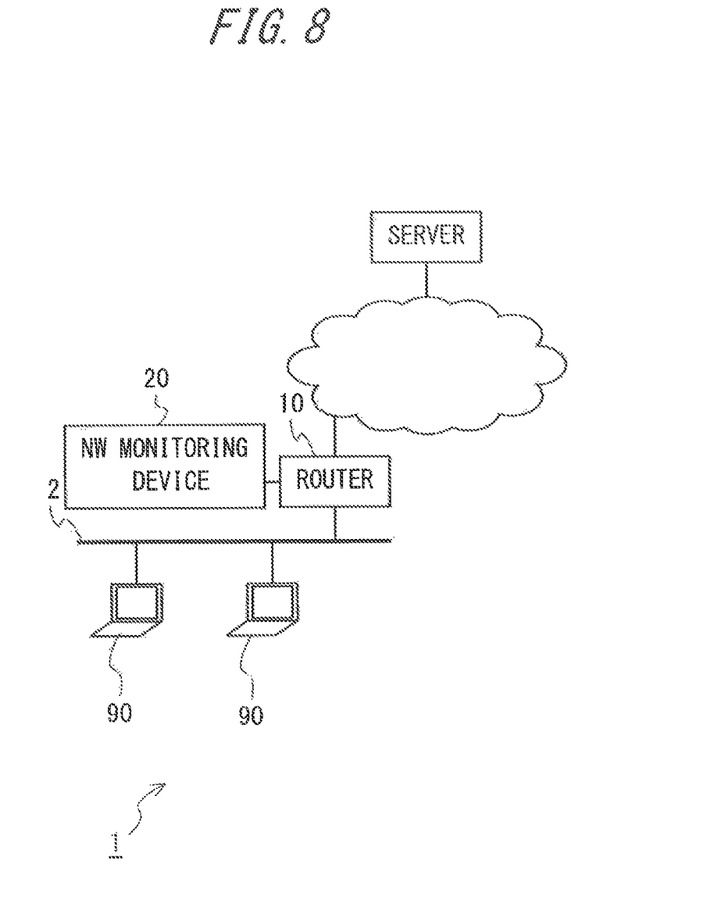
FIG. 8 is a schematic diagram showing a variation of a configuration of a system according to an embodiment.

For example, the network monitoring device 20 may acquire a packet, a frame, or the like that is transmitted and received by the node 90 by being connected to a monitoring port (a mirror port) of a switch or a router (the router 10 in the example shown in FIG. 1) (refer to FIG. 8). In this case, the network monitoring device 20 runs in a passive mode in which acquired packets are not transferred. Alternatively, for example, even if the network monitoring device 20 is not connected to a monitoring port (a mirror port) and is simply connected to the network segment 2, by acquiring all frames flowing through the network segment 2 including those not addressed to the MAC address of the network monitoring device 20, the network monitoring device 20 can acquire a packet, a frame, or the like that is transmitted and received by the node 90. Even in this case, the network monitoring device 20 runs in a passive mode. Alternatively, for example, the network monitoring device 20 may be included in a router or a switch.

What is claimed is:

1. An information processing device comprising:
   a memory; and
   a processor coupled to the memory, the processor being configured to:
   acquire a communication between a first terminal and a second terminal connected to a network, before the communication reaches an opposite party's terminal;
   extract identification information of a communication partner from a first communication transmitted and received between the first terminal and the second terminal prior to transmission and reception of a message for session establishment among acquired communications, the first communication being different from the message for establishing a session to be kept confidential;
   identify the message for session establishment by analyzing a protocol of the communication acquired, the message being included in a second communication and including a digital certificate of the communication partner in a session to be kept confidential;
   extract the digital certificate from the message for session establishment; and
   inspect a validity of the communication partner in the session by comparing the identification information of the communication partner extracted from the first communication with subject server information included in the digital certificate extracted from the message for session establishment.

2. The information processing device according to claim 1, wherein the processor is configured to extract the identification information of the communication partner for which name resolution is required, from a message for name resolution which is transmitted and received prior to the message for session establishment.

3. The information processing device according to claim 1, wherein the processor is configured to extract the identification information of the communication partner from information which is included in the message for session establishment to a mediation server that mediates communication between the first terminal and the second terminal and which indicates a destination of communication via the mediation server.

4. The information processing device according to claim 1, wherein the processor is further configured to acquire information related to the digital certificate from an external server, and
   wherein the processor is configured to inspect the digital certificate based on the information acquired from the external server.

5. The information processing device according to claim 1, wherein the processor is further configured to inspect a security strength of a session that is about to be established by comparing an encrypted communication method included in the message for session establishment with an encrypted communication method defined in advance, the encrypted communication method included in the message for session establishment being used in this session, and the encrypted communication method defined in advance being permitted in an environment in which the information processing device is installed.

6. The information processing device according to claim 1, wherein the processor is configured to inspect the digital certificate by comparing a value of a predetermined field included in the digital certificate with a range which is defined in advance and within which the value of the predetermined field can fall.

7. The information processing device according to claim 1, wherein the processor is further configured to, when a result of the inspecting does not satisfy a predetermined criteria, transmit a notification to the first terminal, the second terminal, or an administrator of the information processing device.

8. The information processing device according to claim 1, wherein the processor is further configured to, when a result of the inspecting does not satisfy a predetermined criteria, interrupt communication between the first terminal and the second terminal.

9. The information processing device according to claim 1, wherein the processor is further configured to assemble contents of communication that is transmitted and received between the first terminal and the second terminal from a plurality of packets acquired, based on identification information attached to each of the plurality of packets, and
   wherein the processor is configured to identify the message for session establishment by analyzing the contents of the communication assembled.

10. A method for causing a computer to execute:
    acquiring a communication between a first terminal and a second terminal connected to a network, before the communication reaches an opposite party's terminal;
    extract identification information of a communication partner from a first communication transmitted and received between the first terminal and the second terminal prior to transmission and reception of a message for session establishment among acquired communications, the first communication being different from the message for establishing a session to be kept confidential;
    identifying the message for session establishment by analyzing a protocol of the communication acquired, the message being included in a second communication and including a digital certificate of the communication partner in a session to be kept confidential;
    extracting a digital certificate from the message for session establishment identified in the protocol analyzing; and
    inspecting a validity of the communication partner in the session by comparing the identification information of the communication partner extracted from the first communication with subject server information included in the digital certificate extracted from the message for session establishment.

11. The method according to claim 10, further causing a computer to execute acquiring information related to the digital certificate from an external server, wherein
in the inspecting, the digital certificate is inspected based on the information acquired from the external server.

12. A computer-readable non-transitory medium on which is recorded a program for causing a computer to execute:
acquiring a communication between a first terminal and a second terminal connected to a network, before the communication reaches an opposite party's terminal;
extracting identification information of a communication partner from a first communication transmitted and received between the first terminal and the second terminal prior to transmission and reception of a message for session establishment among acquired communications, the first communication being different from the message for establishing a session to be kept confidential;
identifying the message for session establishment by analyzing a protocol of the communication acquired, the message being included in a second communication and including a digital certificate of the communication partner in a session to be kept confidential;
extracting a digital certificate from the message for session establishment identified in the protocol analyzing; and
inspecting a validity of the communication partner in the session by comparing the identification information of the communication partner extracted from the first communication with subject server information included in the digital certificate extracted from the message for session establishment.

13. The computer-readable non-transitory medium on which is recorded a program according to claim 12, further causing a computer to execute:
acquiring information related to the digital certificate from an external server, wherein
in the inspecting, the digital certificate is inspected based on the information acquired from the external server.

* * * * *